US006468569B1

(12) United States Patent
Dunker et al.

(10) Patent No.: US 6,468,569 B1
(45) Date of Patent: Oct. 22, 2002

(54) FROZEN UNCOOKED CINNAMON ROLL THAT CAN ATTAIN THE QUALITIES OF FRESHLY PREPARED CINNAMON ROLL WHEN THAWED AND BAKED

(75) Inventors: Myron J. Dunker; Marlin John Wendland, both of Fargo, ND (US)

(73) Assignee: Schwan's Sales Enterprises, Inc., Marshall, MN (US)

( * ) Notice: Subject to any disclaimer, the term of this patent is extended or adjusted under 35 U.S.C. 154(b) by 1005 days.

(21) Appl. No.: 08/655,959

(22) Filed: May 31, 1996

(51) Int. Cl.$^7$ .............................................. A21D 10/00
(52) U.S. Cl. .................... 426/94; 426/293; 426/296; 426/496; 426/502; 426/549
(58) Field of Search ................... 426/94, 502, 28, 426/19, 21, 293, 296, 297, 496, 549

(56) References Cited

U.S. PATENT DOCUMENTS

| | | | |
|---|---|---|---|
| 2,305,712 A | 12/1942 | Kaefer | 99/92 |
| 3,930,773 A | 1/1976 | Bundschuh | 425/133.1 |
| 4,208,441 A | 6/1980 | Westover | 426/293 |
| 4,488,464 A | 12/1984 | Rooke et al. | 83/99 |
| 4,562,080 A | 12/1985 | Tenn | 426/94 |
| 4,585,664 A | 4/1986 | Kohlwey | 426/619 |
| 4,809,575 A | 3/1989 | Swanson | 83/152 |
| 4,847,104 A * | 7/1989 | Benjamin et al. | 426/549 |
| 4,877,632 A | 10/1989 | Nogueroles | 426/502 |
| 4,966,778 A | 10/1990 | Benjamin et al. | 426/19 |
| 5,104,669 A | 4/1992 | Wolke et al. | 426/94 |
| 5,180,603 A | 1/1993 | Moriya et al. | 426/556 |
| 5,232,727 A | 8/1993 | Sugie et al. | 426/549 |
| 5,268,187 A | 12/1993 | Quinlan | 426/496 |
| 5,348,751 A | 9/1994 | Packer | 426/94 |
| 5,366,744 A | 11/1994 | Drummond et al. | 426/128 |
| 5,378,486 A | 1/1995 | Sullivan | 426/549 |
| 5,382,440 A | 1/1995 | Sullivan | 426/138 |
| 5,395,638 A * | 3/1995 | Kincs et al. | 426/94 |

FOREIGN PATENT DOCUMENTS

| | | |
|---|---|---|
| DE | 1 946 917 | 4/1971 |
| DE | 272 406 A1 | 6/1988 |
| DE | 40 31 892 | 4/1992 |
| JP | 63-222642 | 9/1988 |
| JP | 2-182142 | 7/1990 |

OTHER PUBLICATIONS

Rombauer et al. "Joy of Cooking", pp. 621–622, 1975.*
"More Bread Machine Bounty", pp. 100–101, 1994.*
Pillsbury Kitchens' Family Cookbook, p. 70 and 75, 1979.*

* cited by examiner

Primary Examiner—Lien Tran
(74) Attorney, Agent, or Firm—Merchant & Gould P.C.

(57) ABSTRACT

An improved frozen cinnamon roll can be produced using a specific improved recipe and a significantly improved process. The cinnamon roll product can be manufactured and sold in a frozen form to a retail outlet. At the retail outlet, the frozen product can be thawed and baked to form a cinnamon roll that appears substantially equivalent to a fresh cinnamon roll prepared from basic ingredients on site. The recipe involves the use of specific ratios of ingredients that results in a frozen formulation that can be prepared frozen, thawed and baked successfully. In the process, a soft, sweet dough formulation is combined with a fat smear combined with a passivated cinnamon preparation. The soft, sweet, yeast-leavened dough is protected from deactivation by cinnamon using a preferred amount of smear in relation to the cinnamon. Further, the cinnamon is incorporated into the fat, using procedures forming a coated smear, that protect the soft, sweet dough yeast from the cinnamon materials. Preferred parameters relating to the dimensions of the dough sheet, rolled pastry, and amounts of materials are disclosed.

20 Claims, 1 Drawing Sheet

FROZEN UNCOOKED CINNAMON ROLL THAT CAN ATTAIN THE QUALITIES OF FRESHLY PREPARED CINNAMON ROLL WHEN THAWED AND BAKED

FIELD OF THE INVENTION

The invention relates to a unique, frozen, rolled multilayer cinnamon roll pastry prepared from a soft, sweet dough. The rolled multilayer pastry has pastry layers and layers of a fat smear containing a cinnamon preparation between rolled pastry layers. The pastry is prepared using a preferred soft, sweet, pastry recipe, and an improved smear and cinnamon formulae. The preferred process results in an improved frozen product that can be thawed, baked and iced resulting in a finished cinnamon roll pastry, substantially equal in quality to a fresh cinnamon roll pastry freshly prepared from basic or primary ingredients.

BACKGROUND OF THE INVENTION

Baked cinnamon rolls having a sugar icing have been a staple article of home preparation and commerce for many years. Such rolls have been made in a variety of sizes and recipes but have taken two basic product formats.

A first format involves the manufacture of a consumer product comprising canned frozen cinnamon rolls sold in retail outlets. Multiple cinnamon rolls are formed and combined in a well known pop-open fiberboard tube container. The cinnamon rolls are prepared by first separating the rolls from the container. The rolls are then baked, iced and served. These pastries are typically made from a hard dough in a dough extrusion process which is then combined with cinnamon, rolled and frozen into the product as sold. This frozen canned cinnamon roll product is not a premium quality item. The cinnamon rolls after preparation are small, dense and are thinly iced using the icing supplied with the tube. Our search of the prior art reveals Kaefer, U.S. Pat. No. 2,305,712 which relates to a method of making pastry using a chilled or frozen cylindrical mass of dough in an air tight container. The package can be stored until it is needed for the preparation of the pastry food.

The second common product format involves the preparation of a fresh cinnamon roll from basic ingredients. Such rolls can be made commercially or at home.

One common form of such a cinnamon roll is a premium pastry product made and served in a retail bakery outlet. Such retail shops have become common in large retail shopping centers such as shopping malls and other retail complexes. One such embodiment is the cinnamon roll manufactured and sold under the CINNABON® trademark. Cinnamon rolls are made from fresh ingredients under the CINNABON® trademark and are large pastries having a substantial fat content, a substantial sugar icing add-on but are not frozen. Such pastries have been successful because of the flavor and aroma and overall high quality of the product.

Another common form in a homemade cinnamon roll typically made using a variety of pastry recipes. A cinnamon layer without substantial amount of fat, and a homemade icing is used to complete the product. Typical homemade rolls have minimal layers (3–5), a limited fat content and are not frozen. Substantial attention has been given to improving frozen cinnamon roll preparations to achieve the taste, texture, size and overall quality of freshly made cinnamon rolls. While the broad outlines of cinnamon roll preparation is known, little in the art is directed specifically to providing a high quality frozen cinnamon roll.

We have found patents that teach pastry preparation. Bundschuh, U.S. Pat. No. 3,930,733 teaches an industrial machine configured for the manufacture of commercial cinnamon rolls. Bundschuh shows a machine containing a form into which dough is forced into a spiral shape. Nogueroles, U.S. Pat. No. 4,877,632 teaches a method for processing a mass of dough for bakery products. Nogueroles discloses a step-wise sheeting of lumps of dough into a controlled thickness sheet that can be further processed into a finished food item. Packer, U.S. Pat. No. 5,348,751 teaches a rolled mass of dough that can be sliced and formed to obtain a sheet-like article. The dough is preferably used for pizza preparation.

A substantial need in the art exists to provide a frozen cinnamon roll product and process that provides a cinnamon roll that is substantially equal to the quality achieved in a freshly prepared CINNABON® product. Accordingly, a substantial need exists to improve the quality of frozen products.

BRIEF DESCRIPTION OF THE INVENTION

Surprisingly, we have found that a soft, sweet dough can be processed using commercial processing equipment into a rolled cinnamon containing roll pastry. Such soft, sweet doughs have been known to be resistant to commercial machine processing and have been avoided by food scientists in machined products and excluded by food scientists from use in frozen cinnamon roll preparations using machined dough processing. Prior to the invention, product dimensions, dough recipes, and product layers had been selected that result in the successful manufacture of a high quality cinnamon pastry from hard dough or bready dough recipes. In the preferred process of the invention, production rates, recipes, temperatures, and dimensions have been selected to permit the food engineer to obtain a quality product from a soft, sweet dough with smooth uninterrupted processing. The use of a soft sweet dough is an advance.

We have found that the soft, sweet dough can be machined into a sweet dough layer that can be further processed into the cinnamon roll. Such processing involves adjustments of sheet thickness, an addition of a fat smear, and an addition of a preferred cinnamon crumble. After the cinnamon crumble is added, the sheet is rolled into a multilayer cylinder, partially cut or pre-cut into rolls, packaged and frozen into useful frozen rolls. In a preferred mode, multiple rolls are formed into a partially cut cylinder, packaged and frozen for shipment to a remote preparation location. At that location, the cylinder containing multiple rolls are separated into single rolls, carefully returned to room temperature, baked, iced and sold.

For the purposes of this application the term "soft, sweet dough" indicates a dough that is a unique combination of total ingredient cooperation that is processed in a way resulting in a way that results in a unique rheology. The dough has a sweet taste and a soft tender mastication and mouthfeel. These properties and product characteristics are the result of the dough cell structure resulting from the recipe and processing. The elongated unbroken cell structure that departs from the prior art dense chewy dry crumb feel and provides a light soft moist mastication. The soft sweet dough has the following characteristics:

1. The dough is not extruded;
2. The dough is relaxed from the beginning and is not stressed during processing requiring a rest or relaxation step;
3. The dough cell structure is not broken and is in the form of an elongated cell different than typical oval shape with substantial cell breakage; and 4. The rheology of the dough results in a cinnamon roll that can be distinguished from hard or bready baked materials using a Farinograph or Instron measurements.

The appearance of the soft sweet dough is smooth and creamy colored. The dough has a high sweetener content; along with high levels of shortening, milk solids, and whole eggs. All of these ingredients contribute to the tenderness, improved texture, and extended keeping qualities of the baked product.

The term "smear" indicates a spreadable or flowable predominantly fatty composition that can be added in conventional dough processing techniques to a dough layer. The term "crumble" typically refers to a particulate or powdered finely divided sugary solid material which can be added to pastry products in common processing techniques. Crumbles typically include powdered food ingredients including sugars, spices, etc. In the context of this application, a dough sheet typically refers to the product made by rolling a dough mass to a uniform thickness. The product is a dough layer made by typical continuous or semicontinuous processing having an arbitrary length and a width greater than 10 inches commonly between 20 and 50 inches in width. This sheet has a commonly controlled thickness of greater than 1 millimeter and typically between 4 and 6 millimeters.

DETAILED DESCRIPTION OF THE INVENTION

Figure 1:
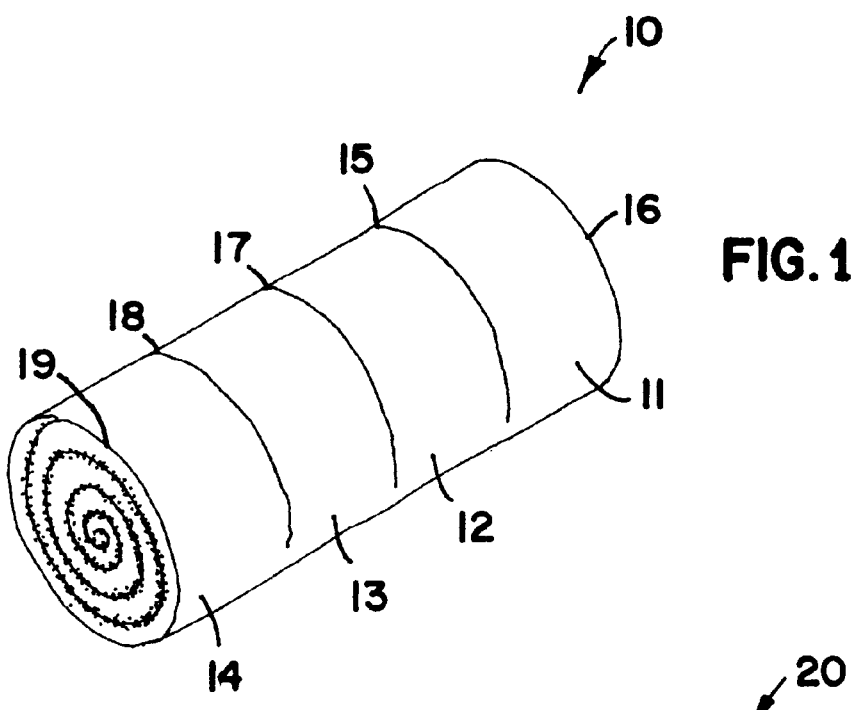
FIG. 1 is an isometric view of a cylindrical unit having multiple frozen or unbaked cinnamon rolls. In this cylindrical unit, four rolls are shown. Each roll is attached to the other with a small portion of an exterior layer. Such a unit is a convenient form for manufacture and packaging.

In somewhat greater detail, the preferred frozen cinnamon roll generally takes the shape of a cylindrical pastry item. The pastry dough is first made by mixing a dough recipe until uniform. The dough is sheeted, coated with smear, crumble is added and the roll is shaped into a cylinder. The cylinder roll is cut into convenient sections and is packaged and frozen. The pastry can be removed from its packaging and from other pastry products similarly packaged and can be thawed, proofed and baked to produce a large cinnamon pastry substantially equal in quality to a pastry prepared from basic fundamental ingredients in a bakery or other retail outlet. Care must be taken to prepare the roll for baking.

Dough Preparation

In the manufacture of the cinnamon rolls of the invention, a soft, sweet dough is manufactured in conventional blending equipment. In the manufacture of the soft, sweet dough of the invention, the dough is typically manufactured in a batch-wise process resulting in a dough batch mass of about 300 to 450 kilograms.

The raw dough recipe can be manufactured in common batch scale processing equipment common in the baking or pastry industry. Typically in the manufacture of the dough, the required amount of flour is typically first added to the processing equipment followed by other particulate ingredients including sugar, non-fat dry milk, yeast and other such ingredients. At this point, typically the fat content or fatty ingredients of the dough recipe are introduced in the form of vegetable shortening, oil, etc. and are blended into the dry ingredients. Eggs, or egg products, if used, can be added and mixed at this stage. Into the blended mass, water, chilled water or a water-ice mixture can be introduced to form a soft, wet dough mass. After mixing the blend to a smooth doughy texture, any additives or other material at relatively low add in proportions can be combined at this point. Such additives can include vitamin or mineral supplements, natural or artificial sweeteners, baking powder, baking soda, salt, process aids, dough conditioners, antioxidants, etc. The initial ingredients are incorporated into the dough mass with mixing until a finished uniform dough mass is prepared. A preferred recipe is as follows:

| DOUGH RECIPE | |
|---|---|
| INGREDIENT | PARTS BY WEIGHT |
| High Gluten Flour | 256.0 |
| Patent Flour | 384.0 |
| Sugar | 56.3 |
| Vegetable Shortening | 24.3 |
| Non Fat Dry Milk | 32.0 |
| Yeast | 80.0 |
| Frozen Whole Eggs | 48.0 |
| Water | 194.0 |
| Ice | 80.0 |
| Ascorbic Acid | 0.1 |
| Vital Wheat Gluten | 8.0 |
| Honey | 8.0 |
| SSL-Powder | 12.8 |
| FLM 100 | 3.2 |
| Mono-Di Powder | 2.1 |
| Baking Powder | 2.1 |
| Baking Soda | 0.2 |
| Salt | 12.8 |

The soft sweet pastry dough comprises about 10 to 15 parts by weight of a sugar composition per each 100 parts of flour, and additionally can contain about 12 to 15 parts by weight of yeast per each 100 parts of flour. Preferably the soft sweet dough comprises a formulation containing 48 to 52 parts by weight of flour, about 5 to 8 parts of sugar, about 2 to 3 parts of shortening, about 2 to 4 parts of non-fat dry milk solids, about 3.5 to 4.5 parts by weight of whole egg composition and about 20–30 parts by weight of cold water, each based on the dough.

Once the dough mass is finished, the mass can be divided into units having a mass of about 5 to 20 kilograms. The dough mass can be roughly divided by hand or can be delivered mechanically from the processing equipment through an automatic divider leaving dough masses of an appropriate manageable or handleable size. Once divided, the dough mass is introduced into a cooling zone and held at a temperature greater than freezing, but below 45° F. until the dough mass is fully equilibrated to the cool environment. The preferred temperature of the dough mass is between 35° F. and 45° F., most preferably for reasons of handling, ease and efficiency between 35° F. and 42° F. After thermal equilibration is complete, the dough mass having a mass of about 5 to 15 kilograms, preferably 5 to 10 kilograms is reduced in thickness and in nature to a dimension of about 10 to 20 millimeters, preferably 12 to 15 millimeters in thickness with a width of about 30 to 40 centimeters. In this stage, the dough mass is roughly shaped for further processing. The rough shape is important, however, the particular process used to achieve the shape is not important. The initial shaping can be done by hand or can be done mechanically using mechanical sheeting apparatus having a single roller thickness reducing mechanism.

After the initial shaping, the roughly formed dough sheet is introduced into a dough sheeting station that further adjusts the dimensions of the dough sheet. The dough must be handled gently to avoid damage to the dough sheet and to maintain high product quality and texture. The purpose of the sheeting station is to reduce the thickness of the sheet to about 10 to 20 millimeters, preferably 12 to 14 millimeters while maintaining the width of the sheet at about 5 to 6 centimeters. Thickness reducing stations having multiple rolls permit thickness reduction without introducing significant stress into the dough mass. The thickness reducing station can contain 2, 3, 4, 6 or more rolls, each roll reducing the thickness of the sheet proportionally to achieve the final desired thickness. During the rolling operations, it is important to maintain the thermal environment such that the dough is not significantly heated. After the thickness reduction, the temperature of the dough is about 65 to 68° F.

After the initial thickness reduction, the dough must be permitted to equilibrate both mechanically and thermally prior to further processing. Such an equilibration permits the dough to relieve internal stresses that might promote failure in further machining. Further, the thermal equilibrium must be maintained to ensure that the dough processes uniformly in subsequent steps. The dough can be rested to achieve such mechanical and thermal equilibration by utilizing either a rest station wherein the stationary dough is simply maintained at a temperature of about 65 to 68° F. or an extended length conveyor can be used to permit the dough to attain equilibrium while being transported on the rest conveyor between processing stations.

After mechanical and thermal equilibrium is attained, the sheet is again introduced into a roll reduction unit. In this station, the thickness of the dough is reduced to a thickness of about 2 to 6 millimeters, preferably 4.5 to 5.5 millimeters with a sheet width of about 40 to 100 centimeters width. Again, the thickness reduction should be attained gently with multiple rollers to avoid stressing the dough. The product leaving this rolling station as a well controlled uniform thickness and width. However, a final gauging station is used at this stage to ensure that the width and thickness is controlled to a final dimension that is within 86±1 centimeters in width and 4.5±0.5 millimeters in thickness. The gauged dough sheet is then trimmed to provide two dough sheets of arbitrary length having a width of 40 to 50 centimeters and a thickness of about 4 to 5 millimeters.

Once the sheets are divided and gauged, a fat smear is then applied to the surface of the sheet. The fat smear is applied at an add on amount of about 17 to 23 grams per 100 grams of dough. The fat smear is typically added in a thickness of up to about 1 millimeter. The fat layer can be added to the full width of the dough layer or can be added to less than the full width of the dough layer.

Commonly, the fat add on width is about 42±1 centimeters to the dough layer width.

The fat smear is a sweet layer prepared from either margarine, butter or mixtures thereof. About 10 to 30 parts of fat smear per each 100 parts of dough is applied to the sheeted dough. The smear add on is typically manufactured by combining the margarine or butter component with sweetener materials in common mixing equipment. In the preparation of the smear composition, the fat components comprising margarine, butter, butter substitute or other fat ingredient is commonly introduced into blending equipment. Into the agitated fat is commonly added sugar in the form of brown sugar, granular sugar, high fructose corn syrup or other useful sugar or sugar substitute. The ingredients are mixed until uniform and other ingredients, used in lower proportion, are then added to the agitated mixture. Such components can include salt; other flavorings such as vanilla, fruit flavors, etc.; additional sweetening materials such as honey, high fructose corn syrup; thickeners including fruit grade zanpan thickeners, jams or jellies. Careful control over smear add on is important to achieve full coverage and passivation of the cinnamon crumble added in the next step. A preferred smear formula is as follows:

| SMEAR FORMULA | |
|---|---|
| INGREDIENT | PARTS BY WEIGHT |
| Margarine | 4.6 |
| Butter | 20.0 |
| Brown Sugar | 60.0 |
| Salt | 4.2 |
| Vanilla | 4.2 |
| Honey Glaze | 0.3 |
| (Raspberry Jam) | 0.7 |

A preferred fat smear comprises 24 to 27 parts of a mixture of margarine and butter, about 60 to 66 parts by weight of a sugar composition and about 0.5 to 1.5 parts of a pectin preparation.

One important characteristic ingredient for cinnamon roll manufacture is the cinnamon spice mixture which is added at this stage to the fat smear. An effective and detectable amount of cinnamon is critical for providing the pastry with a characteristic cinnamon flavor and aroma. While cinnamon can be added to the fat smear alone, we have found that control of the cinnamon add on and ultimate passivation of the cinnamon can be achieved by adding the cinnamon in the form of a solid particulate sugar based crumble. Such a crumble is typically manufactured by combining a particulate or granular sugar with commercial cinnamon spice. Virtually, any particulate or granular sugar can be used including white granular sugar, brown granular sugar, mixtures of white and brown sugar, and other materials. Commonly, the crumble contains a major proportion of sugar (preferably the crumble composition comprises about 1 to 100 parts by weight of sugar composition per each part of cinnamon) and a minor proportion of cinnamon. The common weight ratios are about 1 to 50 parts by weight of cinnamon in 100 parts of the total crumble mixture. The cinnamon crumble can be added to the fat smear using any technology that can achieve a smooth distribution of the particulate material in a uniform add on. The crumble is commonly added to the fat mixture in an amount of about 5 to 35 parts by weight of crumble per part of dough, preferably about 17 to 23 grams per 100 grams dough. The crumble add on can be obtained manually or can be obtained using a mechanical add on device including a hand or automatic mechanical sifter device, or other particulate handling equipment. A preferred crumble recipe is as follows:

| CRUMBLE FORMULA | |
| --- | --- |
| INGREDIENT | PARTS BY WEIGHT |
| Dark Brown Sugar | 50.0 |
| Cinnamon | 5.0 |

After the cinnamon crumble has been added to the fat layer, the cinnamon crumble is preferably incorporated into the fat layer. The cinnamon crumble should be entirely coated or surrounded by the smear and should be suspended or included in the fat layer. We have found that the incorporation of the crumble into the fat layer passivates the cinnamon. We have found that the yeast in the soft, sweet dough can be inhibited by the presence of substantial quantities of cinnamon in direct contact with the dough layer. Such deactivation results in an unacceptable dough quality. Full yeast action is required to obtain a light risen dough quality. Applying the cinnamon to the dough layer without a fat smear or applying the cinnamon to the fat smear layer without incorporating the crumble into the fat results in a dough with reduced yeast activity. Incorporating the cinnamon crumble into the fat is an important step in the overall process resulting in a high quality cinnamon roll product. We have found that simply by passing the crumble coated smear containing dough layer through a rolling station successfully incorporates the crumble into the fat layer. The rolling station rollers obtain a coating of fat from the smear. The result of the roller fat crumble layer interaction results in the crumble being successfully incorporated into the smear protecting the yeast from passivation.

The generally cylindrical spiral wound pastry can contain at least six to eight layers counting from the center of the spiral roll. The pastry has a diameter of greater than 5 cm and a height of greater than 7 cm. The height of the cylindrical roll of pastry is preferably about 6.7 to 7.2 cm. Such a roll can be divided into cylindrical segments for further processing. The pastry is made from a yeast containing sheet of a soft, sweet dough having a thickness greater than about 3 mm. Coated between the layers of soft, sweet dough is a fat smear. The fat smear is applied to virtually the entire internal surface of the spiral wound roll. Sufficient fat smear is applied to the dough to achieve an add-on thickness of about 0.5–2 mm. Onto the fat smear prior to rolling is placed a cinnamon crumble composition. The crumble composition is added to the fat smear after the smear is placed on the pastry sheet. After this crumble is added to the smear, the crumble is pressed into the smear to ensure that the cinnamon crumble is held within the fat smear phase and the fat acts as a barrier between the cinnamon crumble and yeast contained in the dough layer. The crumble is added to the fat at a preferred ratio to achieve coating of the cinnamon crumble by the fat smear thus passivating the yeast and the dough to any deactivating effect from the cinnamon. The preferred product is typically manufactured by a process in which the soft, sweet dough is first sheeted to a thickness less than about 15 mm at a temperature greater than 40° F. This dimension and temperature is required to consistently produce a sheeted product that can be handled and machined to a successful product conclusion. The sheet is first reduced to a thickness of between 4.5 and 5.5 mm. Onto the surface of the sheet is applied the fat smear at a thickness of less than about 2 mm. The cinnamon crumble is then applied to the fat smear and the cinnamon crumble is then compressed into the fat smear incorporating the crumble into the fat producing a dough sheet having a crumble-smear coating. The sheet with coating is rolled into a generally cylindrical roll with at least six layers of dough counting from the center. The roll is then cut to length and frozen. In a preferred product, the dough is initially cut into a length from which three or four full size pastries can be obtained. Such a length can be partially cut to prepare a product having three or four or more individual cinnamon rolls in a length partially connected by dough.

The dough layer now containing the crumble incorporated into the fat smear is formed into a roll having 6 to 10, preferably 7 to 9 swirl layers. The layers are counted beginning at one edge and proceeding across the pastry on a diameter line. Preferably a torpedo roller is used to obtain a long roll that is conveyed from the roller. The roll made from a soft, flexible dough is easily moved because it is flexible and light. We have found that the machining of the soft, sweet dough after blending through thickness adjustment and in the formation of the roll is surprisingly successful. In the past we have found that handling soft, sweet doughs in this way often fail because the dough does not machine well. Often the dough is sticky and hard to transfer from station to station. Further, the dough is fragile, easily torn or otherwise mechanically unstable during handling. Further, after dough manufacture, the yeast begins to work releasing carbon dioxide that lightens the dough causing further mechanical difficulties. After the sheet is converted into a roll, the dimension of the roll is less than 2.5 inches, preferably 2.0–2.5 inches, more preferably about 2.25 inches in diameter. The roll is then sent to a cutting station for division into handleable subunits. The roll can be cut into individual units that can be frozen for subsequent baking at a remote site. However, preferably the roll is cut into a log approximately 9.5–11 inches in length, preferably about 10.5 inches having a 2.5 inch diameter. The log is then subdivided into sections by partially cutting the log into 4 sections. By partial cutting, we mean that the log is not cut through but the cut progresses to greater than about 80% of the diameter of the log or preferably greater than about 85% of the diameter of the log. In one embodiment, the roll is partially cut into at least three cylindrical conjoined segments, the roll having a length greater than about 5.7 millimeters and a thickness of greater than about 5.1 millimeters. Such precutting separates the vast majority of the log into separate sections leaving a small portion of the log acting as a connector portion. After the rolled pastry dough is appropriately cut, the dough is frozen and packaged.

The temperature profile of the freezing process is preferably adapted to maintaining yeast activity.

At a use locus, the cinnamon roll pastry of the invention is carefully thawed, proofed and baked in a process that enhances the yeast activity and the final quality of the cinnamon roll pastry.

The frozen dough is very susceptible to damage if exposed to several freeze/thaw cycles. The dough is kept frozen solid until thawed. Cinnamon roll dough is shaped like a log. This log is scored into four cinnamon rolls. The frozen rolls are divided into units that should weigh about 6.5 ounces to 7.5 ounces. Overweight pastry, once thawed, can be trimmed until they are an acceptable weight. When placing the rolls in trays to thaw, group similar weights together, i.e. 6.5 oz to 7.0 oz rolls in one tray and 7.1 oz to 7.5 oz in another tray. Rolls will proof and bake more consistently if rolls of similar weights are placed in the baking pan together.

Lay the rolls on their sides in dough trays (the maximum number of rolls per tray is 36). Cover the trays with lids. It is important that the lids be placed on the trays tightly to keep the rolls from drying out during thawing. Label the trays with the date, time and number of cinnamon rolls it contains. Place the trays in the thawing rack in the walk in cooler. The rolls will thaw in approximately 6–8 hours. The usable shelf life of thawed cinnamon roll dough is 6 to 12 hours. The dough must be used within 12 hours from the time it is removed from the freezer.

Icing may be stored in the freezer or the cooler. The refrigerated shelf life is 6 weeks. The icing should be allowed to thaw in the cooler for a minimum of 24 to 48 hours. The icing must be room temperature when used to ice the rolls. To ensure that enough icing is at the proper temperature for use, place enough thawed icing at room temperature for the number of cinnamon rolls thawed. Place the icing in an area of average room temperature (70° to 75°), do not place the icing in an area where it may get extremely warm. The room temperature shelf life of the icing is 48 hours.

Preheat proofer equipment for 30 minutes to a temperature setting of 93° F. The humidity setting is 80% R.H.

Put the pan in the preheated proofer and proof (approximately 60 minutes at 105° F. dry bulb temperature, 90° F. wet bulb temperature). Proofing time will be influenced by environmental conditions, the age of the dough, and thawing conditions. Correctly proofed rolls will have increased in size (2 to 3 times larger than frozen size), the dough will spring back when touched, the sharp cut edges will soften, and the center of the roll will be higher than the outside edge. The width of the dough rings will have increased. The lower outside edges of the rolls should be touching each other. Dough proofed at the proper temperature and humidity settings will not be sticky or dry, the dough surface will feel like human skin. Load the rolls into the proofer in batches. A batch may consist of one to size pans of rolls. The batch size will be determined by the number of rolls needed to be baked. Load the batches into the proofer in 20 to 30 minute intervals.

Remove the proofed dough pieces from the proofer. Place the pans in the preheated oven, load the bottom racks first, close the door and start the timer.

Preferred Oven Settings
Oven settings are approximate and may vary in your location. The following settings are for a programmable oven. The larger the number of pans per batch, the longer the rolls will take to bake.

Preheat Temperature: 340°
Stage One
   Cooking Temperature: 330°
   Time: 3 minutes
   Fan Speed: Low
   Fan Mode: Pulse
Stage Two
   Cooking Temperature: 315°
   Time: 7 minutes
   Fan Speed: Low
   Fan Mode: Pulse
Stage Three
   Cooking Temperature: 310°
   Time: 9 Minutes
   Fan Speed: Low
   Fan Mode: Pulse
Determine if the rolls are properly baked. Check the pan on the top rack first. Properly proofed and baked rolls will have an internal temperature of 165° in the center. To determine the internal temperature push the tip of the stem thermometer into the dough located in the center of the roll. Slide the stem thermometer in at an angle to avoid pushing down on the center of the roll. To ensure an accurate temperature reading the tip of the thermometer should be inserted ½ to 1 inch into the roll. The top of the roll should have a dome like shape. The sides of the roll will have baked together. The rolls will be golden brown in color. If the rolls do not meet any of this criteria return them to the oven. Set the timer for the number of minutes you want to continue baking. The top shelf may cook faster than the middle and bottom racks. Check each pan for the properly baked characteristics.

If your location has an icing station, please the hot rolls on the warm surface of the thermal plate. The outside edges of the rolls should be touching each other. Use the serrated icing spatula or the 6" serrated knife to cut the rolls apart.

The total amount of icing per roll should be 1.5 ounces, 9 ounces of icing per pan of six rolls.

| 6 rolls | 12 rolls | 18 rolls |
| --- | --- | --- |
| 9 oz. | 1 lb. 2 oz. | 1 lb. 11 oz. |

Portion out enough icing for the number of pans of rolls being baked. Apply the icing in two phases. Using approximately half of the icing portion, spread icing on the top of each roll with the icing spatula. Avoid pressing down on the center of the rolls. The first coating of icing should melt down into the rings of the rolls. Spread the remaining icing on the top of the rolls and along the edges. Some of the icing should melt ¼ to ½ way down the sides of the rolls.

DETAILED DESCRIPTION OF THE DRAWINGS

FIG. 1 is an isometric view of a four pastry dough unit 10. The dough unit 10 is divided into four roll pastry sections 11, 12, 13 and 14. The unit is separated from the originally manufactured roll by a through cut separation 16. The individual rolls are separated by substantial, but not complete, cuts 15, 17 and 18. The preferred unit has ten layers counting on the diameter from one edge 19 to the other edge. FIG. 1 shows eight layers.

Figure 2:
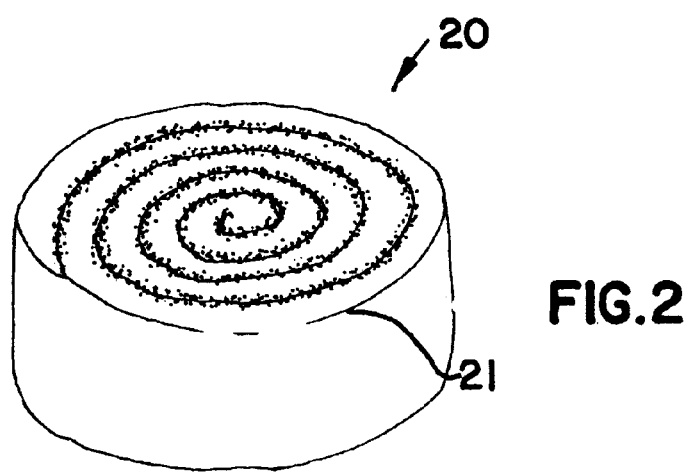
FIG. 2 shows a single roll after separation from the multiple unit. Such a roll is thawed, processed and then baked and iced for sale.

FIG. 2 shows an isometric view of one separated pastry roll 20. The pastry roll is separated from the roll unit at the break away tab portion leaving the broken tab section 21. FIG. 2 shows a risen and proofed roll that initially had dimensions of about 3 inches high and 4 inches in diameter which was increased to about 6 inches high and 4 inches in diameter after proofing and rising.

Figure 3:
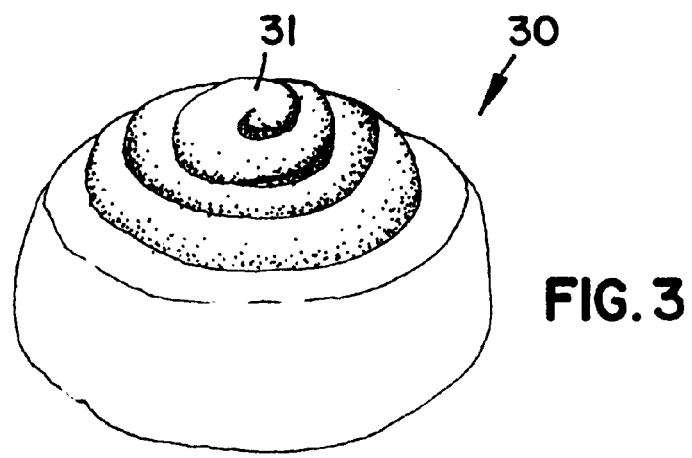
FIG. 3 is an isometric view of a baked but un-iced roll of the invention.

FIG. 3 shows a baked cinnamon roll 30 made from the proofed and risen roll. During baking the center of the roll rises leaving a moderately elevated section 31. During baking this center section initially rises but does retract somewhat when baking is completed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A frozen cylindrical frozen cinnamon roll pastry, that can be thawed and baked to form a product substantially equal in quality to a freshly prepared cinnamon roll, the pastry comprising:

(a) a generally cylindrical spiral roll comprising, a frozen unbaked roll comprising at least six layers counting from the center, the spiral roll having a diameter greater than 5 centimeters and a height greater than 7 centimeters, the roll made from a sweet, soft dough sheet having a thickness greater than about 3 millimeters; and (b) a layer of a fat smear, substantially covering the sheet, the layer having a thickness about 0.5 to 2 millimeters;

(c) a cinnamon crumble composition, passivated by the smear, the crumble composition comprising about 1 to 100 parts by weight of a sugar composition per each part of cinnamon; wherein there is about 5 to 35 parts by weight of crumble per 100 parts of dough, and about 10 to 30 parts of fat smear per each 100 parts of dough; wherein the roll pastry, prior to baking is frozen and when thawed at a use locus, can be baked into a product substantially equal to a freshly prepared roll.

2. The pastry of claim 1 wherein the sheet of step 1(a) has a thickness greater than or equal to about 4 millimeters and in part (c) there are 17 to 23 parts by weight crumble and 17 to 23 parts smear per each 100 parts of dough.

3. The pastry of claim 1 wherein the soft, sweet dough comprises about 10 to 15 parts by weight of a sugar composition per each 100 parts of flour.

4. The pastry of claim 3 wherein the soft, sweet dough comprises about 12 to 15 parts by weight of yeast per each 100 parts of flour.

5. The pastry of claim 1 wherein the generally cylindrical roll of pastry has a height of about 6.7 to 7.2 centimeters and is divided into at least two cylindrical segments.

6. The pastry of claim 6 wherein the generally cylindrical roll is divided into at least three cylindrical segments.

7. The pastry of claim 6 wherein the generally cylindrical roll is divided into at least four cylindrical segments.

8. The pastry of claim 6 wherein the soft, sweet dough comprises a formulation comprising about 48 to 52 parts by weight of a flour composition, about 5 to 8 parts by weight of a sugar composition, about 2 to 3 parts by weight of shortening, about 2 to 4 parts by weight of non-fat dry milk solids, about 3.5 to 4.5 parts by weight of a whole egg composition and about 20 to 23 parts by weight of cold water; each per part of the dough.

9. The pastry of claim 1 wherein the smear comprises a mixture of butter and margarine and comprises a layer of 0.5 to 2 mm.

10. The pastry of claim 9 wherein the fat smear comprises 24 to 27 parts of a mixture of margarine and butter, about 60 to 66 parts by weight of a sugar composition and about 0.5 to 1.5 parts of a pectin preparation.

11. The pastry of claim 1 wherein the crumble comprises a mixture of brown sugar and cinnamon - brown sugar.

12. A process for forming a frozen cinnamon roll pastry, that can be baked to form a product substantially equal in quality to a freshly prepared cinnamon roll, the process comprising:

(a) forming a sheet comprising a soft sweet dough, the sheet having a thickness less than 15 millimeters, at a temperature less than about 65° F.;

(b) reducing the sheet to a thickness of about 2 to 6 millimeters to form a second sheet;

(c) applying a fat smear layer to the second sheet having a thickness of less than about 5 millimeters;

(d) applying a cinnamon crumble, comprising 7 to 10 parts by weight of a sugar composition per each part of cinnamon, to the fat smear layer to form a cinnamon crumble layer and the second sheet to form a coated sheet;

(e) forming a generally cylindrical roll pastry from the coated sheet, at least six layers of dough, counting from the center of the roll;

(f) and dividing the roll pastry into at least two segments; and (g) freezing the segments.

13. The process of claim 12 wherein the sheet of subpart 1(a) is formed from a dough mass having a minimum dimension of about 15 millimeters.

14. The process of claim 12 wherein the sheet of subpart 1(a) is formed at a temperature less than or equal to 65° F.

15. The process of claim 12 wherein after the step of subpart 1(a), the sheet is reduced to a first thickness of about 6 to 10 millimeters to form a first sheet which is permitted to rest for a period of at least about seconds 15 prior to a further reduction in thickness of the first sheet to form the second sheet.

16. The process of claim 12 wherein the thickness of the smear is less than or equal to about 1 millimeter.

17. The process of claim 12 wherein after the crumble is applied to the fat smear, the crumble is pressed into the fat layer coating the crumble with the fat smear layer.

18. The process of claim 12 wherein the roll is formed with seven or more layers counted from the center of the roll.

19. The process of claim 12 wherein the roll is partially cut into at least 3 cylindrical cojoined segments, the roll having a length greater than about 5.7 millimeters, a thickness of greater than about 5.1 millimeters.

20. The process of claim 27 wherein the roll is cut into four cojoined segments.

* * * * *

UNITED STATES PATENT AND TRADEMARK OFFICE
CERTIFICATE OF CORRECTION

PATENT NO. : 6,468,569 B1
DATED : October 22, 2002
INVENTOR(S) : Dunker et al.

It is certified that error appears in the above-identified patent and that said Letters Patent is hereby corrected as shown below:

Title page,
Item [57], ABSTRACT,
Line 10, insert after the sentence ending "and baked successfully." the following sentence:
-- Further, specific process steps are utilized that takes advantage of the improved recipe of pastry formulations. --
Line 19, insert after the last sentence of the ABSTRACT the following sentence:
-- The frozen product can be carefully thawed and baked under controlled conditions to form a cinnamon roll product substantially identical to a fresh cinnamon roll. --

Column 12,
Line 2, delete second occurrence of the words "brown sugar"
Line 34, "seconds 15" should read -- 15 seconds --
Line 48, "claim 27" should read -- claim 19 --

Signed and Sealed this

Third Day of June, 2003

JAMES E. ROGAN
*Director of the United States Patent and Trademark Office*